United States Patent
Yun et al.

(10) Patent No.: US 10,017,631 B2
(45) Date of Patent: Jul. 10, 2018

(54) RADAR COVER-USE RESIN COMPOSITION, AND RADAR COVER AND RADAR APPARATUS OBTAINED THEREFROM

(71) Applicant: LG CHEM, LTD., Seoul (KR)

(72) Inventors: ChangHun Yun, Daejeon (KR); SuMin Lee, Daejeon (KR); GiDae Choi, Daejeon (KR); YeonSik Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 80 days.

(21) Appl. No.: 15/313,895

(22) PCT Filed: Dec. 28, 2015

(86) PCT No.: PCT/KR2015/014366
§ 371 (c)(1),
(2) Date: Nov. 23, 2016

(87) PCT Pub. No.: WO2016/105178
PCT Pub. Date: Jun. 30, 2016

(65) Prior Publication Data
US 2017/0190884 A1    Jul. 6, 2017

(30) Foreign Application Priority Data

Dec. 26, 2014 (KR) .................. 10-2014-0190465

(51) Int. Cl.
*C08K 7/24* (2006.01)
*H01Q 1/42* (2006.01)

(52) U.S. Cl.
CPC ............. *C08K 7/24* (2013.01); *H01Q 1/42* (2013.01); *C08K 2201/001* (2013.01); *C08K 2201/004* (2013.01)

(58) Field of Classification Search
CPC ..................................................... H01Q 1/42
See application file for complete search history.

(56) References Cited

U.S. PATENT DOCUMENTS 6,762,237 B2    7/2004 Glatkowski et al.

FOREIGN PATENT DOCUMENTS

| CN | 1791322 A | 6/2006 |
|---|---|---|
| JP | 2003-158395 A | 5/2003 |
| KR | 20100058342 A | 6/2010 |
| KR | 1020110069011 A | 6/2011 |
| KR | 1020120017034 A | 2/2012 |

OTHER PUBLICATIONS

Bien Dong Che, et al. "Effects of Carbon Nanotube Dispersion Methods on the Radar Absorbing Properties of MWCNT/Epoxy Nanocomposites", Macromolecular Research, vol. 22, No. 11, pp. 1221-1228 (2014).
Han, M.S., et al., "Bent-shape effects of multi-walled carbon nanotube on the electrical conductivity and rheological properties of polycarbonate/multi-walled carbon nanotube nanocomposites," Synthetic Metals 161, 2011, pp. 1629-1634.
Arai, et al.: Methods to Evaluate the Length and Curvature of Carbon Nanotubes, The Society of Polymer Science, Japan, vol. 66, No. 7, Jul. 1, 2009, pp. 243-249.

*Primary Examiner* — Graham Smith
(74) *Attorney, Agent, or Firm* — Dentons US LLP

(57) ABSTRACT

The present invention provides a resin composition for a radar cover. The resin composition includes carbon nanotubes and a polymer resin. The resin composition does not interfere with the transmission of signals from a radar while protecting the radar from the surroundings.

15 Claims, 1 Drawing Sheet

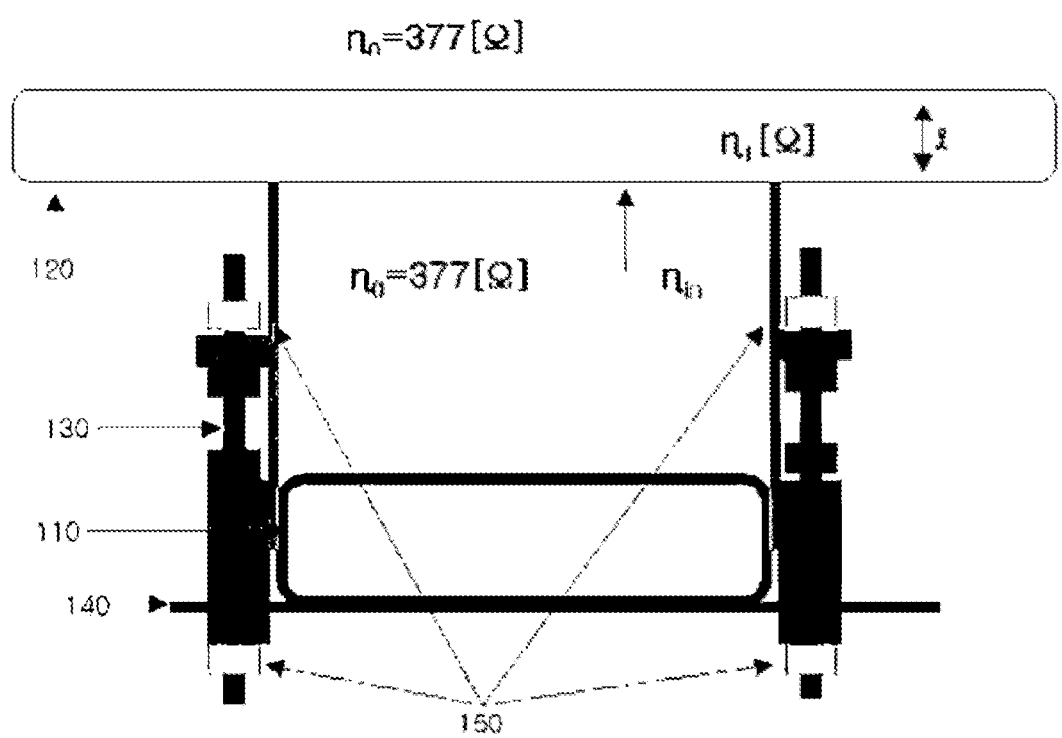

RADAR COVER-USE RESIN COMPOSITION, AND RADAR COVER AND RADAR APPARATUS OBTAINED THEREFROM

This application is a National Stage Application of International Application No. PCT/KR2015/014366, filed Dec. 28, 2015, and claims the benefit of Korean Patent Application No. 10-2014-0190465, filed Dec. 26, 2014, the contents of which are incorporated herein by reference in their entirety for all purposes as if fully set forth below.

TECHNICAL FIELD

The present invention relates to a resin composition for a radar cover, a radar cover obtained from the resin composition, and a radar system. More specifically, the present invention relates to a resin composition for a radar cover that does not interfere with the transmission of signals from a radar while protecting the radar from the surroundings, a radar cover obtained from the resin composition, and a radar system.

BACKGROUND ART

In recent years, research has been conducted on radar-related technologies, such as forward collision warning systems that warn a driver of possible collision with a preceding vehicle or obstacle based on the measured speed of and distance to the preceding vehicle or obstacle, lane departure warning systems that warn a driver when the driver's own vehicle is leaving its lane, advanced emergency braking systems that enable safe driving by automatic deceleration, acceleration, and constant speed control based on driving situations, and adaptive cruise control systems.

Particularly, adaptive cruise control (ACC) systems and collision damage mitigation (CDM) systems have been successfully developed. ACC systems are equipped to detect a preceding vehicle to control the speed of a driver's vehicle to that of the preceding vehicle. CDM systems are equipped to warn a driver that the driver's own vehicle will collide with a preceding vehicle and to automatically actuate a brake. Such systems are currently being produced on an industrial scale.

In ACC and CDM systems, radars are employed to detect preceding vehicles and radar covers are mounted in front of the radars to protect the radars from the external environmental factors, such as moisture. Radars are also widely used for many applications, including weather monitoring and search, as well as in ships and airplanes due to their ability to clearly distinguish targets from surrounding geographical features and obstacles even at night and in foggy and rainy conditions.

There still remains a need for a radar cover that is mounted in front of a radar to perform its fundamental function to protect the radar equipment and through which signals from the radar are transmitted efficiently with reduced reflection loss.

DISCLOSURE OF THE INVENTION

Technical Problem

A first object of the present invention is to provide a resin composition for a radar cover including carbon nanotubes.

A second object of the present invention is to provide a radar cover obtained by processing the resin composition.

A third object of the present invention is to provide a radar system including the radar cover.

Solution to Problem

In order to achieve the first object, the present invention provides a resin composition for a radar cover including a polymer resin and carbon nanotubes having a static bending persistence length of 80 to 1000 nm.

According to one embodiment, the carbon nanotubes may take the form of rigid random coils.

According to one embodiment, the carbon nanotubes may have a static bending persistence length of 100 nm to 500 nm.

In order to achieve the second object, the present invention provides a radar cover obtained by extrusion, injection molding or extrusion/injection molding of the resin composition.

In order to achieve the third object, the present invention provides a radar system including a radar, a radar bracket, and the radar cover.

Advantageous Effects of the Invention

The presence of carbon nanotubes in the resin composition of the present invention maximally suppresses reflection loss of electromagnetic waves from the radar cover and improves the transmission of electromagnetic waves through the radar cover. Therefore, the radar cover can prevent the performance of the radar from deterioration resulting from weather changes.

BRIEF DESCRIPTION OF THE DRAWINGS

FIG. 1 is a schematic view illustrating the construction of a radar system according to an embodiment of the present invention.

BEST MODE FOR CARRYING OUT THE INVENTION

The present invention will now be described in detail. It should be understood that the terms and words used in the specification and claims are not to be construed as having common and dictionary meanings, but are construed as having meanings and concepts corresponding to the spirit of the invention in view of the principle that the inventor can define properly the concept of the terms and words in order to describe his/her invention with the best method.

According to one aspect of the present invention, a resin composition for a radar cover includes a polymer resin and carbon nanotubes having a static bending persistence length of 80 to 1000 nm.

The resin composition of the present invention can be used to produce a molded article or a radar cover. The use of the carbon nanotubes suppresses reflection loss of electromagnetic waves from the radar cover as much as possible and increases the electromagnetic transmission efficiency of the radar cover.

The term "electromagnetic transmission efficiency" described herein is a concept contrary to electromagnetic interference shielding effectiveness. The electromagnetic transmission efficiency may increase with decreasing electromagnetic interference shielding effectiveness.

The carbon nanotubes (CNTs) included in the resin composition may take various forms. For example, the carbon nanotubes may be in the form of rigid random coils.

The carbon nanotubes in the form of rigid random coils can be defined as carbon nanotubes that do not undergo elastic deformation caused by thermal energy (kT, where k is the Boltzmann constant and T is the absolute temperature) within the contour length of the used particles because their greater effective bending modulus is greater than the thermal energy and whose overall particle size (end-to-end distance) is linearly proportional to the square root of the apparent molecular weight.

The carbon nanotubes (CNTs), for example, in the form of rigid random coils, included in the resin composition of the present invention may have a static bending persistence length of 80 nm or greater, for example, in the range of 80 to 1000 nm, specifically, 100 to 500 nm. Within this range, efficient transmission of signals from a radar can be ensured.

When the carbon nanotubes in the form of rigid random coils have continuous curvatures, the static bending persistence length is the mean value of the radii of curvatures of the carbon nanotubes. Based on statistical physics, the static bending persistence length can be more accurately defined by Equation 1:

$$D_b \equiv \frac{\langle R^2 \rangle}{L^2} \cong \left(\frac{2l_{p0}}{L}\right)\left(\frac{1+\cos'\theta'}{1-\cos'\theta'}\right) = C\left(\frac{2l_{p0}}{L}\right) = \frac{2l_{sp}}{L}$$

where $D_b$ is a bending ratio, R is an end-to-end distance vector, $l_{sp}$ ($=Cl_{p0}$) is the static bending persistence length, C is a constant, L is a contour length, $l_{p0}$ is an arbitrary segment length, and θ is a bent angle from the axis.

The number of walls the carbon nanotubes may vary. For example, the carbon nanotubes may exist in single- or multi-walled structures. The multi-walled structures include double-walled structures and triple-walled structures.

The carbon nanotubes may be included in an amount of 0.1 to 10 parts by weight, for example, 0.1 to 5 parts by weight, based on 100 parts by weight of the polymer resin. Within this range, the reflection loss of electromagnetic waves from the radar cover can be minimized and the transmission of electromagnetic waves through the radar cover can be improved without deteriorating the mechanical properties of the radar cover.

The polymer resin used in the resin composition may be, for example, a thermosetting resin, a thermoplastic resin or a photocurable resin.

As the thermosetting resin, there may be used, for example, a polyamide, polyether, polyimide, polysulfone, epoxy, unsaturated polyester or phenolic resin. As the photocurable resin, there may be used, for example, a radically curable resin (an acrylic monomer, an acrylic oligomer, such as polyester acrylate, urethane acrylate or epoxy acrylate, unsaturated polyester or a thiol-ene polymer), a cationically curable resin (an epoxy, oxetane or vinyl ether resin). As the thermoplastic resin, there may be used, for example, a nylon, polyethylene, polyamide, polyester, polycarbonate, polyarylate or polycycloolefin resin.

The thermoplastic resin is not limited and may be any of those known in the art. According to one embodiment, the thermoplastic resin may be selected from the group consisting of: polycarbonate resins; polypropylene resins; polyamide resins; aramid resins; aromatic polyester resins; polyolefin resins; polyester carbonate resins; polyphenylene ether resins; polyphenylene sulfide resins; polysulfone resins; polyethersulfone resins; polyarylene resins; cycloolefin resins; polyetherimide resins; polyacetal resins; polyvinyl acetal resins; polyketone resins; polyether ketone resins; polyether ether ketone resins; polyaryl ketone resins; polyether nitrile resins; liquid crystal resins; polybenzimidazole resins; polyparabanic acid resins; vinyl polymer and copolymer resins obtained by polymerization or copolymerization of one or more vinyl monomers selected from the group consisting of aromatic alkenyl compounds, methacrylic esters, acrylic esters, and vinyl cyanide compounds; diene-aromatic alkenyl compound copolymer resins; vinyl cyanide-diene-aromatic alkenyl compound copolymer resins; aromatic alkenyl compound-diene-vinyl cyanide-N-phenylmaleimide copolymer resins; vinyl cyanide-(ethylene-diene-propylene (EPDM))-aromatic alkenyl compound copolymer resins; polyolefins; vinyl chloride resins; chlorinated vinyl chloride resins; and mixtures thereof. Specific kinds of these resins are well known in the art and may be appropriately selected by those skilled in the art.

Examples of the polyolefin resins include, but are not limited to, polypropylene, polyethylene, polybutylene, and poly(4-methyl-1-pentene). These polyolefin resins may be used alone or in combination thereof. In one embodiment, the polyolefins are selected from the group consisting of polypropylene homopolymers (e.g., atactic polypropylene, isotactic polypropylene, and syndiotactic polypropylene), polypropylene copolymers (e.g., polypropylene random copolymers), and mixtures thereof. Suitable polypropylene copolymers include, but are not limited to, random copolymers prepared by polymerization of propylene in the presence of at least one comonomer selected from the group consisting of ethylene, but-1-ene (i.e. 1-butene), and hex-1-ene (i.e. 1-hexene). In the polypropylene random copolymers, the comonomer may be present in any suitable amount but is typically present in an amount of about 10% by weight or less (for example, about 1 to about 7% by weight or about 1 to about 4.5% by weight).

The polyester resins refer to homopolyesters or copolyesters as polycondensates of dicarboxylic acid component and diol component skeletons. Representative examples of the homopolyesters include polyethylene terephthalate, polypropylene terephthalate, polybutylene terephthalate, polyethylene-2,6-naphthalate, poly-1,4-cyclohexanedimethylene terephthalate, and polyethylene diphenylate. Particularly preferred is polyethylene terephthalate that can be used in many applications due to its low price. The copolyesters are defined as polycondensates of at least three components selected from the group consisting of components having a dicarboxylic acid skeleton and components having a diol skeleton. Examples of the components having a dicarboxylic acid skeleton include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyldicarboxylic acid, 4,4'-diphenylsulfone dicarboxylic acid, adipic acid, sebacic acid, dimer acid, cyclohexane dicarboxylic acid, and ester derivatives thereof. Examples of the components having a glycol skeleton include ethylene glycol, 1,2-propanediol, 1,3-butanediol, 1,4-butanediol, 1,5-pentanediol, diethylene glycol, polyalkylene glycol, 2,2-bis(4'-β-hydroxyethoxyphenyl)propane, isosorbates, 1,4-cyclohexanedimethanol, and spiroglycols.

Examples of the polyamide resins include nylon resins and nylon copolymer resins. These polyamide resins may be used alone or as a mixture thereof. The nylon resins may be: polyamide-6 (nylon 6) obtained by ring-opening polymerization of commonly known lactams such as ε-caprolactam and ω-dodecalactam; nylon polymerization products obtainable from amino acids such as aminocaproic acid, 11-aminoundecanoic acid, and 12-aminododecanoic acid; nylon polymers obtainable by polymerization of an aliphatic, alicyclic or aromatic diamine, such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, meta-xylenediamine, para-xylenediamine, 1,3-bisaminomethylcyclohexane, 1,4-bisaminomethylcyclohexane, 1-amino-3-aminomethyl-3,5,5-trimethylcyclohexane, bis(4-aminocyclohexane)methane, bis(4-methyl-4-aminocyclohexyl)methane, 2,2-bis(4-aminocyclohexyl)propane, bis(aminopropyl)piperazine or aminoethylpiperidine, with an aliphatic, alicyclic or aromatic dicarboxylic acid, such as adipic acid, sebacic acid, azelaic acid, terephthalic acid, 2-chloroterephthalic acid or 2-methylterephthalic acid; and copolymers and mixtures thereof. Examples of the nylon copolymers include: copolymers of polycaprolactam (nylon 6) and polyhexamethylene sebacamide (nylon 6,10); copolymers of polycaprolactam (nylon 6) and polyhexamethylene adipamide (nylon 66); and copolymers of polycaprolactam (nylon 6) and polylauryllactam (nylon 12).

The polycarbonate resins may be prepared by reacting a diphenol with phosgene, a haloformate, a carbonate or a combination thereof. Specific examples of such diphenols include hydroquinone, resorcinol, 4,4'-dihydroxydiphenyl, 2,2-bis(4-hydroxyphenyl)propane (also called tisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, and bis(4-hydroxyphenyl)ether. Of these, 2,2-bis(4-hydroxyphenyl)propane, 2,2-bis(3,5-dichloro-4-hydroxyphenyl)propane or 1,1-bis(4-hydroxyphenyl)cyclohexane is preferred, and 2,2-bis(4-hydroxyphenyl)propane is more preferred.

The polycarbonate resins may be mixtures of copolymers prepared from two or more different diphenols. As the polycarbonate resins, there may be used, for example, linear polycarbonate resins, branched polycarbonate resins, and polyester carbonate copolymer resins.

The linear polycarbonate resins may be, for example, bisphenol-A type polycarbonate resins. The branched polycarbonate resins may be, for example, those prepared by reacting a polyfunctional aromatic compound, such as trimellitic anhydride or trimellitic acid, with a diphenol and a carbonate. The polyfunctional aromatic compound may be included in an amount of 0.05 to 2 mole %, based on the total moles of the corresponding branched polycarbonate resin. The polyester carbonate copolymer resins may be, for example, those prepared by reacting a difunctional carboxylic acid with a diphenol and a carbonate. As the carbonate, there may be used, for example, a diaryl carbonate, such as diphenyl carbonate, or ethylene carbonate.

As the cycloolefin polymers, there may be exemplified norbornene polymers, monocyclic olefin polymers, cyclic conjugated diene polymers, vinyl alicyclic hydrocarbon polymers, and hydrides thereof. Specific examples of the cycloolefin polymers include ethylene-cycloolefin copolymers available under the trade name "Apel" (Mitsui Chemicals), norbornene polymers available under the trade name "Aton" (JSR), and norbornene polymers available under the trade name "Zeonoa" (Nippon Zeon).

According to one embodiment, the polymer resin is preferably selected from polycarbonate, polyacrylonitrile-butadiene-styrene, polyester carbonate, polypropylene, polyethylene, and mixtures thereof.

The resin composition of the present invention may further include at least one additive selected from the group consisting of antibacterial agents, release agents, heat stabilizers, antioxidants, light stabilizers, compatibilizers, dyes, inorganic additives, surfactants, nucleating agents, coupling agents, fillers, plasticizers, impact modifiers, admixtures, colorants, stabilizers, lubricants, antistatic agents, pigments, and flame proofing agents. The additive may be used in an amount of 0.1 to 5 parts by weight, for example, 0.1 to 3 parts by weight, based on 100 parts by weight of the polymer resin.

The resin composition of the present invention may be subjected to extrusion, injection molding or extrusion/injection molding to produce a molded article. The molded article may be used as a radar cover.

Due to the presence of CNTs, the radar cover may have a reflection loss of 10 dB or less, for example, 1 to 6 dB, and an electromagnetic transmission efficiency of 12 dB or less, for example, 1 to 10 dB.

The radar cover may have various colors, for example, a transparent color. The thickness of the radar cover may be, for example, from 0.5 to 10 mm.

For an improved aesthetic appearance of the radar cover, a metal or paint may be further added to the resin composition to create a pattern or a metallic image. For example, a part or all of the radar cover members may be coated with a paint to realize a particular pattern. Indium, tin or a paint capable of reflecting visible light may be used to produce a metallic image.

The present invention also provides a radar system including the radar cover. An embodiment of the radar system is illustrated in FIG. 1.

Referring to FIG. 1, the radar system may include a radar 110, a radar cover 120, adjusting bolts 130, a radar bracket 140, and fixing nuts 150.

The radar cover is provided to protect the radar system from the surroundings, ensuring safe use of the radar without interfering with signal transmission and reception of the radar.

The present invention will be explained in detail with reference to the following examples. However, these examples may be embodied in various different forms and the scope of the invention should not be construed as being limited thereto. The examples are provided to fully convey the invention to a person having ordinary knowledge in the art.

EXAMPLE 1

3 wt % of carbon nanotubes in the form of rigid random coils and having a static bending persistence length of 110 nm and 97 wt % of a polyamide resin (LUMID GP-1000B) were extruded in a twin-screw extruder (L/D=42, φ=40 mm) while raising the temperature profile to 280° C., to produce pellets having dimensions of 0.2 mm×0.3 mm×0.4 mm.

The pellets were molded in an injection molding machine under the flat profile conditions at a temperature of 280° C. to produce 3.2 mm thick, 12.7 mm long dog-bone shaped radar cover specimens. Each specimen was allowed to stand at 23° C. and a relative humidity of 50% for 48 hr.

EXAMPLE 2

Radar cover specimens were produced in the same manner as in Example 1, except that carbon nanotubes in the form of rigid random coils and having a static bending persistence length of 270 nm were used.

EXAMPLE 3

Radar cover specimens were produced in the same manner as in Example 1, except that carbon nanotubes in the form of rigid random coils and having a static bending persistence length of 340 nm were used.

COMPARATIVE EXAMPLE 1

Radar cover specimens were produced in the same manner as in Example 1, except that carbon nanotubes in the form of rigid random coils and having a static bending persistence length of 70 nm were used.

COMPARATIVE EXAMPLE 2

Radar cover specimens were produced in the same manner as in Example 1, except that carbon nanotubes in the form of rigid random coils and having a static bending persistence length of 6 nm were used.

EXPERIMENTAL EXAMPLE 1

The specimens obtained in Examples 1-3 and Comparative Examples 1-2 were measured for tensile strength and impact strength. The results are described in Table 1.
The mechanical properties of the specimens were measured by the following methods.
(1) The impact strength (kgf·cm/cm) of each specimen (⅛" thick) was measured in accordance with ASTM D256.
(2) The tensile strength (kgf/cm$^2$) of each specimen was measured in accordance with ASTM D638.

EXPERIMENTAL EXAMPLE 2

The radar cover specimens obtained in Examples 1-3 and Comparative Examples 1-2 were measured for reflection loss and electromagnetic interference shielding effectiveness. The results are described in Table 2.

TABLE 1

| | Mechanical properties | | |
| --- | --- | --- | --- |
| | Static bending persistence length (nm) | Tensile strength (MPa) | Impact strength (J/m) |
| Example 1 | 110 | 140 | 60 |
| Example 2 | 270 | 120 | 50 |
| Example 3 | 340 | 110 | 50 |
| Comparative Example 1 | 70 | 140 | 50 |
| Comparative Example 2 | ≤10 | 120 | 60 |

TABLE 2

| | Mechanical properties | | |
| --- | --- | --- | --- |
| | Static bending persistence length (nm) | Reflection loss (dB) | Electromagnetic interference shielding effectiveness (EMISE, dB) |
| Example 1 | 110 | 6 | 5 |
| Example 2 | 270 | 5 | 5 |
| Example 3 | 340 | 3 | 6 |
| Comparative Example 1 | 70 | 2 | 15 |
| Comparative Example 2 | ≤10 | 2 | 17 |

As described in Tables 1 and 2, the inventive radar covers had reflection losses of ≤6 dB without deterioration of their mechanical properties and showed electromagnetic transmission efficiencies of 2 to 3 times higher than the comparative radar covers. Therefore, the inventive radar covers are expected to be suitable for use in radar systems, etc.

The invention claimed is:
1. A resin composition for a radar cover comprising a polymer resin and carbon nanotubes having a static bending persistence length of 80 to 1000 nm.
2. The resin composition according to claim 1, wherein the carbon nanotubes are in the form of rigid random coils.
3. The resin composition according to claim 1, wherein the carbon nanotubes are present in an amount of 0.1 to 10 parts by weight, based on 100 parts by weight of the polymer resin.
4. The resin composition according to claim 1, wherein the carbon nanotubes are single-walled carbon nanotubes, multi-walled carbon nanotubes or a mixture thereof.
5. The resin composition according to claim 1, wherein the carbon nanotubes have a static bending persistence length of 100 nm to 500 nm.
6. The resin composition according to claim 1, wherein when the carbon nanotubes in the form of rigid random coils have continuous curvatures, the static bending persistence length is the mean value of the radii of curvatures of the carbon nanotubes.
7. The resin composition according to claim 1, wherein the polymer resin is a thermosetting resin, a thermoplastic resin, a photocurable resin or a mixture thereof.
8. The resin composition according to claim 7, wherein the thermoplastic resin is selected from the group consisting of: polycarbonate resins; polypropylene resins; polyamide resins; aramid resins; aromatic polyester resins; polyolefin resins; polyester carbonate resins; polyphenylene ether resins; polyphenylene sulfide resins; polysulfone resins; polyethersulfone resins; polyarylene resins; cycloolefin resins; polyetherimide resins; polyacetal resins; polyvinyl acetal resins; polyketone resins; polyether ketone resins; polyether ether ketone resins; polyaryl ketone resins; polyether nitrile resins; liquid crystal resins; polybenzimidazole resins; polyparabanic acid resins; vinyl polymer and copolymer resins obtained by polymerization or copolymerization of one or more vinyl monomers selected from the group consisting of aromatic alkenyl compounds, methacrylic esters, acrylic esters, and vinyl cyanide compounds; diene-aromatic alkenyl compound copolymer resins; vinyl cyanide-diene-aromatic alkenyl compound copolymer resins; aromatic alkenyl compound-diene-vinyl cyanide-N-phenylmaleimide copolymer resins; vinyl cyanide-(ethylene-diene-propylene (EPDM))-aromatic alkenyl compound copolymer resins; polyolefins; vinyl chloride resins; chlorinated vinyl chloride resins; and mixtures thereof.

9. The resin composition according to claim 1, further comprising at least one additive selected from the group consisting of antibacterial agents, release agents, heat stabilizers, antioxidants, light stabilizers, compatibilizers, dyes, inorganic additives, surfactants, nucleating agents, coupling agents, fillers, plasticizers, impact modifiers, admixtures, colorants, stabilizers, lubricants, antistatic agents, pigments, and flame proofing agents.

10. A radar cover obtained by processing the resin composition according to claim 1.

11. The radar cover according to claim 10, wherein the processing is extrusion, injection molding or extrusion/injection molding.

12. The radar cover according to claim 11, wherein the radar cover has a thickness of 0.5 to 10 mm.

13. The radar cover according to claim 11, wherein the radar cover has a reflection loss of 10 dB or less.

14. The radar cover according to claim 11, wherein the radar cover has an electromagnetic transmission efficiency of 12 dB or less.

15. A radar system comprising the radar cover according to claim 11, a radar, and a radar bracket.

\* \* \* \* \*